United States Patent
Meirosu et al.

(10) Patent No.: US 9,557,796 B2
(45) Date of Patent: Jan. 31, 2017

(54) NETWORK NODE HAVING A POWER SAVING MODE

(75) Inventors: Catalin Meirosu, Stockholm (SE); Annikki Welin, Solna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 487 days.

(21) Appl. No.: 13/997,447

(22) PCT Filed: Dec. 24, 2010

(86) PCT No.: PCT/EP2010/070730
§ 371 (c)(1),
(2), (4) Date: Aug. 27, 2013

(87) PCT Pub. No.: WO2012/084064
PCT Pub. Date: Jun. 28, 2012

(65) Prior Publication Data
US 2013/0332762 A1    Dec. 12, 2013

(51) Int. Cl.
*G06F 1/32* (2006.01)
*H04L 12/24* (2006.01)
*H04L 12/12* (2006.01)

(52) U.S. Cl.
CPC .............. *G06F 1/3234* (2013.01); *H04L 12/12* (2013.01); *H04L 41/08* (2013.01); *H04L 41/0816* (2013.01); *H04L 41/0833* (2013.01); *Y02B 60/32* (2013.01); *Y02B 60/34* (2013.01); *Y02B 60/35* (2013.01)

(58) Field of Classification Search
CPC .... G06F 1/3234; G06F 1/3287; G06F 1/3278; G06F 1/3206; H04L 41/08; H04L 41/0816; H04L 41/0833
See application file for complete search history.

(56) References Cited

U.S. PATENT DOCUMENTS 6,519,223 B1 *  2/2003  Wager .................... H04L 1/1809
                                                370/216
6,760,852 B1 *  7/2004  Gulick ................... G06F 1/3215
                                                710/306
(Continued)

FOREIGN PATENT DOCUMENTS

WO    WO 2010/144002 A1    12/2010

OTHER PUBLICATIONS

Cisco, Ethernet Operations, Administration, and Maintenance, Apr. 27, 2006 (http://www.cisco.com/c/en/us/td/docs/ios/12_2sr/12_2sra/feature/guide/srethoam.html).*

(Continued)

*Primary Examiner* — Kim Huynh
*Assistant Examiner* — Siamak S Hefazi
(74) *Attorney, Agent, or Firm* — Patents on Demand, P.A.; Brian K. Buchheit; Scott M. Garrett

(57) ABSTRACT

A network node has an interface which has different modes of operation, including at least a power saving mode and a normal operating mode. The node has a power saving mode management module for maintaining information about whether the interface is in the power saving mode of operation. The power saving mode management module is able to make available to one or more layers higher than the physical layer of the interface information about whether the interface is in the power saving mode of operation.

19 Claims, 7 Drawing Sheets

(56) References Cited

U.S. PATENT DOCUMENTS

| | | | |
|---|---|---|---|
| 6,980,839 B2 | 12/2005 | Dacosta | |
| 7,254,732 B2* | 8/2007 | Bashford | G06F 1/3203 |
| | | | 713/300 |
| 2008/0259807 A1* | 10/2008 | Yan | H04L 43/10 |
| | | | 370/242 |
| 2008/0318580 A1* | 12/2008 | Zhong | H04W 52/0229 |
| | | | 455/444 |
| 2009/0327506 A1 | 12/2009 | Diab | |
| 2010/0111081 A1* | 5/2010 | Diab | H04L 12/12 |
| | | | 370/389 |
| 2010/0191848 A1* | 7/2010 | Fujita | H04L 45/02 |
| | | | 709/224 |

OTHER PUBLICATIONS

P. Reviriego et al.; "Burst Transmission for Energy-Efficient Ethernet"; Published by the IEEE Computer Society; 1089-7801/10; Jul. Aug. 2010; IEEE Internet Computing; pp. 50-57.
D. Taich et al.; "10GBASE-T Low-Power Idle Proposal"; 802.3az Plenary meeting May 2008; 22 pages.
A. Healey; "1000BASE-T Low-Power Idle"; Energy Efficient Ethernet; IEEE P802.3az Task Force; LSI; Munich, Germany; May 13, 2008; 22 pages.
International Search Report, PCT/EP2010/070730, Jul. 21, 2011.
Written Opinion of the International Preliminary Examining Authority, PCT/EP2010/070730, Nov. 30, 2012.
International Preliminary Report on Patentability, PCT/EP2010/070730, Mar. 19, 2013.

* cited by examiner

NETWORK NODE HAVING A POWER SAVING MODE

CROSS-REFERENCE TO RELATED APPLICATION

This application is a 35 U.S.C. §371 national stage application of PCT International Application No. PCT/EP2010/070730, filed on 24 Dec. 2010, the disclosure and content of which is incorporated by reference herein in its entirety. The above-referenced PCT International Application was published in the English language as International Publication No. WO 2012/084064 A1 on 28 Jun. 2012.

TECHNICAL FIELD

The present invention relates to a network node having a power saving mode, and in particular to a network node that is able to provide higher layers with information that the network node is in a power saving mode. It also relates to a corresponding method.

BACKGROUND

There is an increasing desire to reduce power consumption of network devices. One known way of reducing power consumption is to put a device into a mode in which it has lower power consumption than when it is in its normal operating mode. For example an interface of a network node may adopt a power saving mode when if it detects that the traffic level over the link(s) from the interface has fallen to a threshold level, or has been below a threshold level for a predefined time period. In a power saving operating mode the interface may perform operations at a lower speed than in its normal operating mode, or may even enter a "sleep mode" in which the interface becomes dormant. For example the IEEE 802.3 az standard defines a low power mode for an Ethernet interface, in which:

For 100 Mbit/s and gigabit links, an Ethernet interface that does not have data to send would put the physical layer of the system into a sleep mode. The node may signal to other nodes of the network that its interface is entering the sleep node, and other nodes may also out their interface into a sleep mode once they learn that no data will be coming from the node that has entered the sleep mode.

For 10 Gbit/s links, the operating speed is stepped down to slower speeds saving 10-20 W per link. Running at lower speed may not save as much power as putting the node into a sleep mode, but for a link operating at this speed it might take too long to wake up a sleeping interface if it was put all the way to sleep.

An Ethernet node that operates according to the IEEE 802.3 az standard is often referred to as an "Energy Efficient Ethernet" node.

The IEEE 802.3 az standard has defined number of parameters, that are periodically transmitted over a link during the low-power state to allow the peering node or neighbour node (that is the node at the other end of the link) to refresh timing and equalization parameters during low power idle modes. The low power idle (LPI) mode in the IEEE 802.3 az standard allows for transmission of (currently) three types of frames: sleep, refresh, awake (for example, see http://www.ieee802.org/3/az/public/may08/taich_02_0508.pdf). These are very simple control words transmitted on the network and processed by the LPI circuit. A "sleep" message indicates that the interface sending the message is entering a sleep mode or other low power mode, an "awake" message indicates that the interface sending the message is leaving the sleep or other low power mode and has returned to its normal operation mode, and a "refresh" message is sent periodically by the interface while it is in the sleep or other low power mode to indicate that it is still active and to allow the partner node to refresh timing and equalization parameters.

One problem encountered when an interface of a node is put into a low power mode is that nodes communicate at different layers. One example of communication at different layers is shown in FIG. 1, which shows the 7 layers of the well-known OSI (Open Systems Interconnection) model. In ascending order, the layers are: a physical layer 1; a data link layer 2; a network layer 3; a transport layer 4; a session layer 5; a presentation layer 6; and an application layer 7. In most cases a network node will periodically exchange "check messages" with neighbouring nodes to tell the neighbouring nodes that the node is still operating correctly. Thus, routers will exchange "hello messages", switches will send frames etc. These messages are sent at regular intervals for multiple protocols at layers 2-4 and above of the OSI model—but the sending of a check message by one layer is not co-ordinated with the sending of a check message by another layer. As noted above, the low power mode of the IEEE 802.3 az standard puts the interface into a low power mode at the level of the physical layer 1, but every time that a node is required to send a check message by a higher layer, for example by the data link layer 2, the network layer 3 or the transport layer 4, the interface must be taken out of the low power mode in order to send the check message. The lack of co-ordination between different layers in sending their check messages means that the interface is brought out of the low power mode every time that one of the layers above the physical layer wished to exchange check messages with other nodes, and this limits the power saving that can be achieved.

Furthermore, if a check message is not sent when expected because the interface of a node is in a low power mode, this could be taken as an indication that the node was faulty so that the Network Management System (NMS) would be informed of the failure of the node. This can lead to the NMS receiving false indications that a node has failed, when the node is in fact still operational but is in a low power mode.

Indeed, some protocols might consider that a "link down event" had occurred if they noted an interface in the low power mode. For example the VDSL2/GPON mechanism (see—http://www.ieee802.org/3/10GEPON_study/email/pdfV3kikUObAl.pdf) is based on longer timeouts than the IEEE 802.3 az standard and does not send refresh messages. With a VDSL2/GPON mechanism, it is possible that the OSPF (Open Shortest Path First) layer would consider an interface in the low power mode as a "link down event".

SUMMARY

A first aspect of the invention provides a network node that has an interface. The interface has different modes of operation, including at least a power saving mode and a normal operating mode. The node has a power saving mode management module for maintaining information about whether the interface is in the power saving mode of operation. The power saving mode management module is able to make available to one or more layers higher than the physical layer of the interface information about whether the interface is in the power saving mode of operation.

The term "make available" as used herein is intended to encompass both a case where the power saving mode management module transmits information about whether the interface is in the power saving mode to the higher layer(s) and a case where the power saving mode management module makes available to the higher layer(s) information about whether the interface is in the power saving mode to the higher layer(s) without necessarily transmitting the information to the higher layer(s) (for example a case where the power saving mode management module allows the higher layer(s) read-only access to information contained in the power saving mode management module).

The term "power saving mode" as used herein is intended to denote an operating mode, into which the interface may be put, and in which the interface has a lower power consumption (for example a significantly lower power consumption) than when the interface is in its normal operating mode. The interface may still be active when it is in its power saving mode (for example the operating speed may be stepped down to slower speeds in the power saving mode as in, for example, a power saving mode of an Ethernet interface operating according to the IEEE 802.3 az standard for a 10 Gbit/s link), or the interface may become essentially inactive in the power saving mode (for example, a "sleep" mode of an Ethernet interface operating according to the IEEE 802.3 az standard for a 100 Mbit/s link).

The invention allows layers above the physical layer (for examples layers 2-7 in the case of the OSI model of FIG. 1) to be aware of whether the interface of the node is in a power saving mode (such as a sleep mode). This enables, for example, two or more of the higher layers (that is, two or more of the layers above the physical layer) to coordinate the times at which they send their check message, thereby reducing the number of time that the interface must be brought out the power saving mode and hence increasing the power savings that can be effected.

As another example, a higher layer may decide not to send a check message if it knows that the interface is in a power saving mode. Since the higher layer make a deliberate decision not to send the check message it can inform other nodes and/or the Network Management System of this, and this prevents the absence of the check message being treated as an indication that there is a fault with the node. The number of incorrect fault indications is therefore reduced.

The management module may be adapted to communicate with a layer higher than the physical layer in response to a query received from the layer higher than the physical layer.

The management module may be adapted to send information about whether the interface is in a power saving mode of operation to one or more higher layers that have registered with the management module to receive information about whether the interface is in a power saving mode of operation.

The network node may further comprise a communication channel for communicating with another network node about whether the interface is in a power saving mode of operation, the communication channel being separate from the interface.

The management module may be adapted to maintain a count of refresh message sent by the interface while the interface is in the power saving mode. This is appropriate for an interface operating according to the IEEE 802.3az standard. In other standards, for example the VDSL2/GPON standard, timers are used and there are no refresh messages. This is explained for example in http://www.ieee802.org/3/10GEPON_study/email/pdfV3kikUObAl.pdf The node may be an Ethernet node and may comprise an Ethernet operation administration and service OAM module, the Ethernet OAM module being in communication with the management module.

The network node may further comprise a service OAM module, the Ethernet OAM module communicating with the service OAM module.

The Ethernet OAM module may be adapted to, upon receipt from the Service OAM module for transmission from the interface, to:
  determine the type of frame; and
  for at least one type of frame, inform the Service OAM module if the interface is in its power saving mode.

A second aspect of the invention provides a method of operating a network node having an interface operable in a power saving mode and a normal mode. The method comprising maintaining, at a power saving mode management module within the network node, information about whether the interface is in the power saving mode of operation. Information about whether the interface is in the power saving mode of operation may then be sent to one or more layers higher than the physical layer of the interface.

The method may comprise sending information about whether the interface is in the power saving mode of operation to a layer higher than the physical layer in response to a query received from the layer higher than the physical layer.

The method may comprise sending information about whether the interface is in a power saving mode of operation to one or more higher layers that have registered with the management module to receive information about whether the interface is in a power saving mode of operation.

The method may comprise communicating with another network node about whether the interface is in a power saving mode of operation over a communication channel that is separate from the interface.

The method may comprise maintaining, at the management module, a count of refresh message sent by the interface while the interface is in the power saving mode.

The node may be an Ethernet node having an Ethernet OAM module, and the method may comprise the Ethernet OAM module communicating with the management module.

The network node may comprise a service OAM module, and the method may comprise the Ethernet OAM module communicating with the service OAM module.

The Ethernet OAM module may:
  upon receipt of a frame from the Service OAM module for transmission from the interface, determines the type of frame; and
  for at least one type of frame, inform the Service OAM module if the interface is in its power saving mode.

A third aspect of the present invention provides a method comprising receiving, at a higher layer than the physical layer of an interface of a network node operable in a power saving mode and a normal mode, information about whether the interface is in the power saving mode of operation. A decision about sending a check message at the level of the higher layer may be made on the basis of the received information about whether the interface is in a power saving mode of operation.

The higher layer may receive the information about whether the interface is in a power saving mode of operation in response to a query sent to the network node by the higher layer.

The higher layer may pre-register with the network node to receive information about whether the interface is in a power saving mode of operation.

Making a decision about sending a check message may comprise deciding not to send the check message.

Making a decision about sending a check message may comprise the higher layer coordinating the sending of the check message with the sending of a check message from another higher layer.

A fourth aspect of the invention provides a machine readable medium that provides instructions which, when executed by a set of processors, cause the set of processors to perform operations that comprise maintaining, at a management module within a network node, information about whether an interface having different modes of operation, including a power saving mode and a normal mode, is in the power saving mode of operation. The operations also comprise sending, to one or more layers higher than the physical layer of the interface, information about whether the interface is in the power saving mode of operation

BRIEF DESCRIPTION OF THE DRAWINGS

Preferred embodiments of the invention will be described by way of example with reference to the accompanying drawings in which.

DETAILED DESCRIPTION

Figure 2:
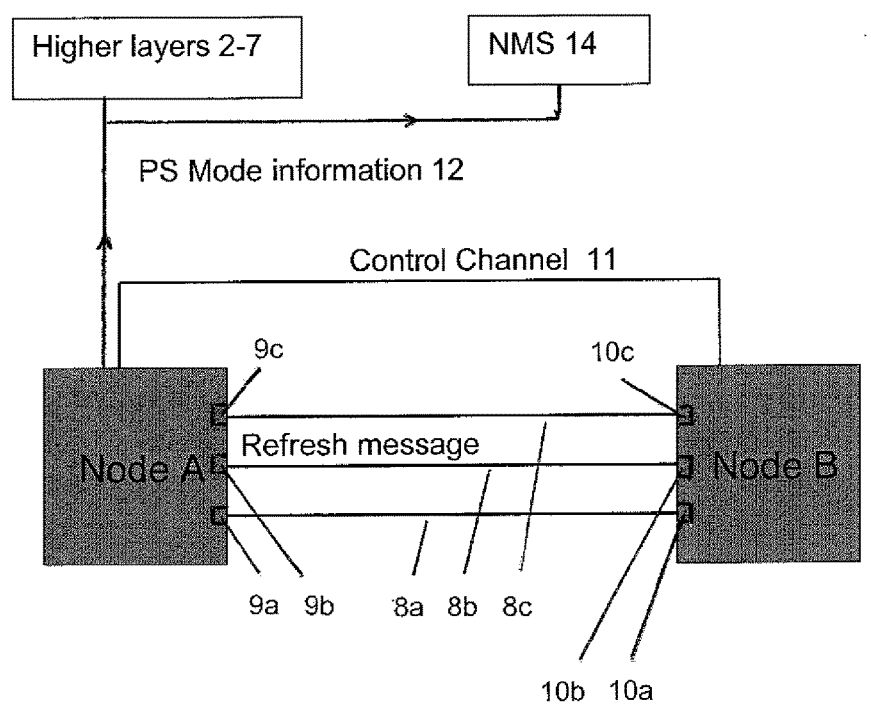
FIG. 2 is a schematic illustration of a network including a node according to the present invention.

FIG. 2 illustrates the principle of the present invention. Two nodes, node A and node B, are able to exchange traffic data with one another over links 8a, 8b, 8c. Each link 8a, 8b, 8c is between a respective interface 9a, 9b, 9c of node A and a respective interface 10a, 10b, 10c of node B. Node A and node B are also linked by a control channel 11 which may carry control information from node A to node B or vice versa.

At least one of the interfaces 9a, 9b, 9c of node A is operable in, at least, a normal operation mode and a power saving mode in which the associated link(s) become dormant at the physical level (level 1 of FIG. 1), and in which the interface consumes less power than it does in its normal operation mode. The interface may for example switch itself into the power saving mode after a predetermined time in which it has no traffic to transmit, or if the traffic waiting to be transmitted falls below a threshold. The power saving mode may for example be a "sleep mode" in which the interface shuts itself down to the greatest extent possible while still remaining alive, or it may be a mode in which the operating speed of the interface is reduced while the interface remains in operation. The interface(s) having a power saving mode may for example be Ethernet interfaces that operate according to the IEEE 802.3 az standard.

It should be noted that some protocols, for example some Ethernet protocols such as 100Base-TX and 10 GBase-T, allow a link to enter a power saving mode for traffic in one direction, while remaining in normal operation for traffic in the reverse direction. Where the invention is applied to a node operating according to such a protocol, an interface 9a, 9b, 9c may enter its power saving mode regardless of the level of traffic from the corresponding interface 10a, 10b, 10c. In this case the interface in node B is not required to have a power saving mode of operation.

Conversely other protocols, for example some Ethernet protocols such as 1000Base-T, only allow a link to enter a power saving mode for traffic in both directions over the link, while remaining in normal operation for traffic in the reverse direction. Where the invention is applied to a node operating according to such a protocol, an interface 9a, 9b, 9c of node A may enter its power saving mode only if the corresponding interface 10a, 10b, 10c of node B also enters it power saving mode (which accordingly requires that the corresponding interface 10a, 10b, 10c of node B is operable in a power saving mode).

The present invention proposes that information about whether an interface in node A is in its power saving mode is maintained in node A—for example, as described below node A may have a "Power saving mode management module" (PSMMM) that maintains information about whether an interface of node A is in its power saving mode. The information about whether an interface of node A is in its power saving mode is made available to layers higher than the physical layer, for example to one or more of the layers 2-7 of the OSI layer structure of FIG. 1. This is shown schematically in FIG. 2 as "LPI Mode Information" 12 being passed from node A to one or more higher layers. A higher layer may then make a decision about sending a check message on the basis of the received information about whether the interface is in a power saving mode of operation and, for example, may decide not to send a check message if this would require awakening the interface from its power saving mode. Alternatively the higher layer may co-ordinate the sending of the check message with the sending of a check message from another higher layer, so that the interface has to be awakened only once to send check messages at two or more higher layers. The invention therefore reduces the number of times that the interface must be awakened from its power saving mode, and so increases the time that the interface can spend in the power saving mode and so increase the power saving.

Furthermore, information about whether an interface of node A is in its power saving mode may also be passed to a Network Management System 14. It is advantageous for the NMS to be aware of whether an interface is in its power saving mode as the Network Management System is then able instruct an interface to be woken from its power saving mode if the traffic load in the network becomes higher.

Moreover, as the higher layers can be aware that an interface is in its power saving mode, this reduces the likelihood of a higher incorrectly judging that the interface has failed, and so reduces the probability of false error messages.

In a further aspect of the invention, where node B also has one or more interfaces that may switch to a power saving mode, node A may receive, over the control channel 11, information from node B about whether an interface of node B is in its power saving mode. This allows node A and node B to coordinate power states.

Embodiments of the invention will be described with reference to examples in which the interface(s) 9a, 9b, 9c of node A having a power saving mode are Ethernet interfaces that have a power saving mode according to the IEEE 802.3 az standard (such interfaces are sometimes called an "energy-efficient Ethernet interface"). This is for the purposes of illustration only, and the invention is not restricted to interfaces that operate according to the IEEE 802.3 az standard, nor even to Ethernet interfaces.

Figure 3:
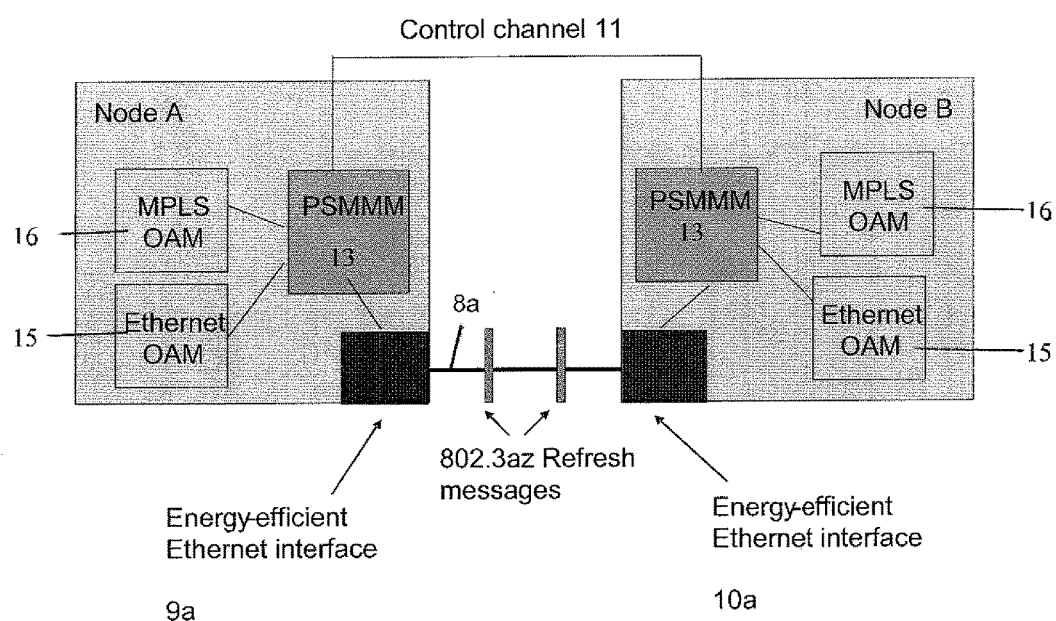
FIG. 3 is a schematic illustration of a network node according to an embodiment of the present invention.

FIG. 3 is a schematic illustration of a first embodiment of the invention. Node A has one or more Ethernet interfaces that have a power saving mode according to the IEEE 802.3 az standard (only one such interface 9a is shown in FIG. 3 for simplicity) that communicate with associated interfaces in node B (only one such interface 9a is shown in FIG. 3 for simplicity) over associated links (only one such link 8a is shown in FIG. 3 for simplicity). Node A further comprises a management module 13 that monitors whether the interfaces of node A are in their sleeping mode (or other power saving mode).

An interface that has a power saving mode at the physical layer has essentially 5 possible states—"active", "going to sleep", "quiet", "refresh" and "wake-up". The "active" state is the normal operating state of the interface, and the "quiet" state is the power saving state of the interface. The "going to sleep" state is when the interface in transition from the "active" state to the "quiet" state, and the "wake-up" state is when the interface in transition from the "quiet" state to the "active" state—both transitions occupy a finite time, during which the interface sends a "sleep" message or an "awake" message respectively, to inform other nodes that it is entering or leaving the power saving mode. Finally, when the interface is in the "quiet" state it periodically has short periods of activity when it sends a "refresh message" to interface at the other end of the link, and this is the refresh state. The management module can determine whether an interface is in the power saving mode by, for example, noting that an interface been through a "going to sleep" state but has not been through a "wake-up" phase. This may be done by, for example noting that an interface sent a "sleep" message but has not sent an "awake" message—the interface may signal to the management module whenever it sends a "sleep" message or an "awake" message.

Moreover, in one optional embodiment of the invention the interface may signal to the management module whenever it sends a "refresh" message so that the management module 13 can record the number of "refresh" messages that have been sent since an interface entered a power saving mode, for example by incrementing or decrementing a counter every time the interface sends a "refresh" message. This provides information as to how long the interface has been in its power saving mode. The counter is reset, for example to zero, when the interface enters and/or leaves the power saving mode.

Information in the management module is available to higher-layer protocols (that is to protocols at layers above the physical layer). For example, a higher layer protocol interested in the power state of an interface of node A that has a lower power mode may register with the management module 13. Whenever the management module becomes aware that the interface changes from its normal operating mode to its power saving operating mode or vice versa, the management module 13 may inform all higher-layer protocols that have registered with the management module 13 to receive information on that interface. Additionally or alternatively, a higher layer protocol that has registered interest in an interface with the management module 13 may have read access to the information in the management module 13 relating to that interface, for example may have read access to the counter if one is present in the management module (for example the higher layer protocol may periodically poll the management module 13 to read the counter). Additionally or alternatively, a higher layer protocol interested in the power state of an interface of node A that has a lower power mode may send a query to the management module 13, to which the management module 13 responds by informing the higher-layer protocol whether the interface is in its power saving mode and optionally how long the interface has been in its power saving mode. It may send a query to the management module 13 at regular or sporadic intervals, or it may send a query to the management module 13 when it requires information about the status of an interface.

Where node A and node B both have a management module 13, the management modules of the two nodes may communicate with one another, for example through the control channel 11. This allows node A to receive information about the power states of interfaces in node B, or to pass to node B information about the power states of interfaces in node A. Furthermore where nodes A and B are nodes in a larger network, node A (or B) may pass to node B (or A) information that node A (or B) has received about the power states of one or more other nodes (not shown) that are in communication with node A (or B). This allows the nodes to become aware of the power states of interfaces in other nodes of the network, and thus to coordinate power states at network level. For example, it is possible to determine whether any interface along a desired network path is in a power saving mode and, if so, either seek to delay a transmission or re-route a transmission to avoid having to awaken the interface(s) from their power saving mode. Moreover, if the management modules of neighbouring nodes communicate through a communication channel that does not pass through from the interfaces 9a, 10a, as is the case when the management modules of the nodes communicate through the control channel 11, the management modules of the nodes can communicate with one another without having to wake the interfaces 9a, 10a from their power saving modes.

A higher-layer protocol that needs to send a message, for example a "hello message" to initiate data transmission, along a path through the network will query a power saving mode management module, for example the power saving mode management module in the originating node of the path, with respect to the power state of interfaces along the path. The queried power saving mode management module needs to be able to map the logical topology of the network over the physical paths available in order to answer such a request. This could be done by the power saving mode management module accessing information from a path computation engine or other similar topology databases. In Ethernet networks, the information is available in the forwarding information base FIB of the node. The power saving mode management modules of the nodes along the path need to communicate between them on the control channel 11 in order to determine the power state of all interfaces along the path.

Furthermore, the management module 13 may communicate information about whether node A is in a power saving mode to a Network Management System (NMS) (not shown in FIG. 3, but shown in FIG. 2).

In addition to the power saving mode management module 13 of a node providing higher layer protocols with access to information as to whether an interface of the node is in its power saving mode, a power saving mode management module 13 of the invention may also be arranged to force an interface of the node to wake-up from its power saving mode and return to its normal mode of operation. For example, a higher-layer protocol (such as an Open Shortest Path First OSPF protocol) could check with the power saving mode management module 13 of a node as to the status of a particular interface of the node. If the interface is in its power saving mode, the higher-layer protocol could mark it the interface, and any associated link, as being in stand-by mode and not use the interface and its links for a while. In a case where a higher-layer protocol needs to send a packet from an interface that is in "stand-by", it will communicate this to the power saving mode management module 13 which in turn forces the interface to come up from its power saving mode (this involves communication from the power saving mode management module 13 to the interface to force, in the case of the IEEE 802.3 az standard or the VDSL2/GPON standard, the sending of wake up frames from the interface).

FIG. 3 shows two examples of modules operating according to a higher layer protocol that can communicate with the power saving mode management module 13. These are a module 15 operating according to an Ethernet OAM (Operations, Administration, and Maintenance) protocol and a module 16 operating according to a Multiprotocol Label Switching (MPLS) OAM protocol. For example, one or both of these modules 15, 16 may register with the power saving mode management module 13 to receive/access information about one or more of the interface 9a of the node, or may send queries to the power saving mode management module 13 to obtain information about the operating mode of one or more of the interface 9a of the node.

Figure 1:
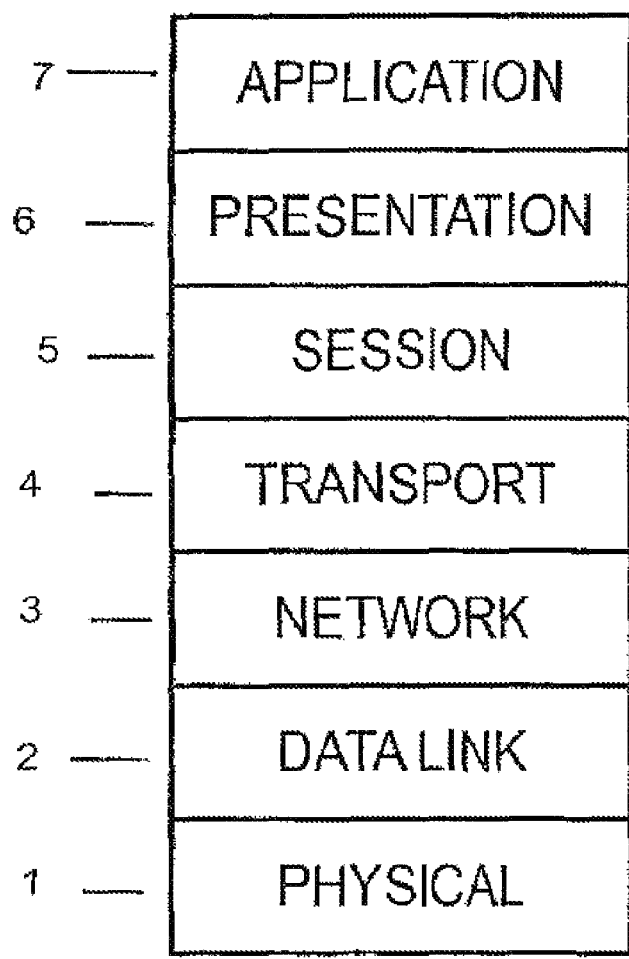
FIG. 1 is a schematic illustration of the 7 layers of the OSI model.

The Ethernet OAM protocol is a protocol that covers discovery, link monitoring, and remote fault detection and relies on a new, optional sublayer in the Data Link Layer 2 of the OSI model of FIG. 1. Providing the module 15 running the Ethernet OAM protocol with information about whether an interface of the node is in its power saving mode improves the reliability of the protocol, as it will be aware whether an interface of a link that it is monitoring is in the power saving mode.

The MPLS OAM protocol directs and carries data from one network node to the next with the help of labels, and makes it possible to create "virtual links" between nodes. The MPLS OAM protocol operates at a layer of the OSI model of FIG. 1 that is generally considered to lie between traditional definitions of the Data Link Layer 2 and the Network Layer 3, and it sometimes referred to as a "Layer 2.5" protocol. Providing the module 16 running the MPLS OAM protocol 16 with information about whether an interface of the node is in its power saving mode makes it possible for the MPLS OAM protocol to avoid routing traffic via an interface that is in its power saving mode, thereby minimising the number of time an interface has to be awoken from its sleep mode.

Other examples of higher layer protocols that might receive or access information about whether an interface is in its power saving mode include, without limit, the following protocols:
OSPF (Open Shortest Path First);
BGP (Border Gateway Protocol);
IS-IS (Intermediate System-Intermediate System);
Any spanning tree protocol;
Bidirectional Forwarding Detection (BFD);
Label Switching Path (LSP).

The power saving mode management module 13 may be implemented in any convenient way. For example, the power saving mode management module 13 may be implemented on the same hardware as the management CPU of the node A. OAM protocols such as the Ethernet OAM protocol or the MPLS OAM protocol run as a process on the management CPU of the node, so implementing the power saving mode management module 13 on the same hardware as the management CPU allows the OAM protocols to communicate directly with the power saving mode management module 13.

Alternatively the power saving mode management module 13 may be implemented on the same hardware as the interface 9a of node A. This allows the power saving mode management module 13 to include a counter that is updated (for example is incremented or decremented by 1) every time the associated interface sends a refresh message.

Alternatively, the counter may be separate from the power saving mode management module 13. For example, an interface 9a may include a counter which keeps a record of the number of refresh messages sent by the interface. The power saving mode management module 13 may then read the counter at the interface whenever it requires information about the power state of the interface to send to a higher level protocol.

A power saving mode management module 13 of the invention may be implemented as a set of one or more processors. Instructions for causing the set of processors to perform operations according to the invention may be provided on a machine-readable medium such as, for example, magnetic tape or a magnetic or optical disc.

Figure 6:
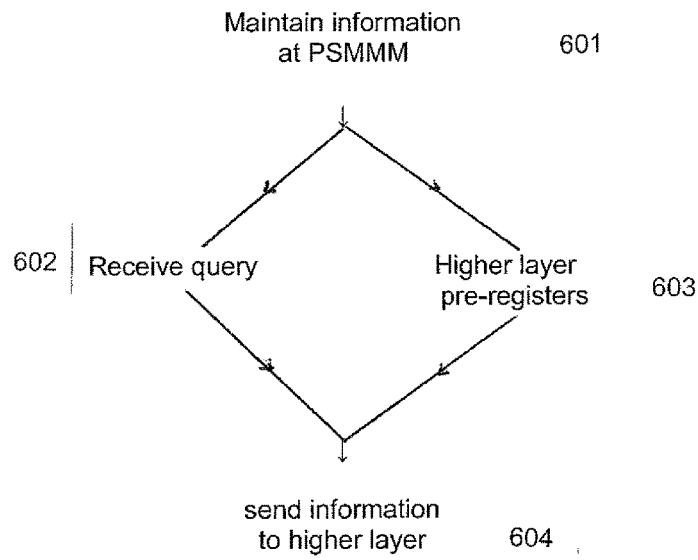
FIG. 6 is a block flow diagram of a method according to an embodiment of the present invention.

FIG. 6 is a block flow diagram showing the principal operations carried out at a power saving mode management module 13 of the present invention. At 601, information about whether an interface of a node is in its power saving mode, and optionally how long the interface has been in its power saving mode, is maintained at the power saving mode management module of the node. When the power saving mode management module 13 receives a query from a higher level protocol (or from a module running a higher layer protocol) at 602, the power saving mode management module 13 sends at 604 the higher level protocol (or the module running the higher layer protocol) information about whether the interface is in its power saving mode, and optionally how long the interface has been in its power saving mode.

Alternatively, a higher layer protocol (or a module running a higher layer protocol) may, at 603, pre-register with the power saving mode management module 13 of a node to receive information about whether an interface of the node is in its power saving mode; in this case the information about whether the interface is in its power saving mode, and optionally how long the interface has been in its power saving mode, that is sent at 604 from the power saving mode management module 13 to the higher layer protocol (or to the module running the higher layer protocol) is sent as a consequence of this pre-registration rather than in response to a specific query—for example the power saving mode management module 13 may send information to the higher layer protocol (or to the module running the higher layer protocol) at intervals, or whenever the interfaces enters or leaves its power saving state.

It should be noted that in this embodiment sending information to the higher layer protocol at 604 may encompass the higher layer protocol (or the module running the higher layer protocol) accessing information held in the power saving mode management module 13, preferably according to read-only access—for example the higher layer protocol (or the module running the higher layer protocol)

may, as described above, access a counter held in the power saving mode management module 13.

Figure 7:
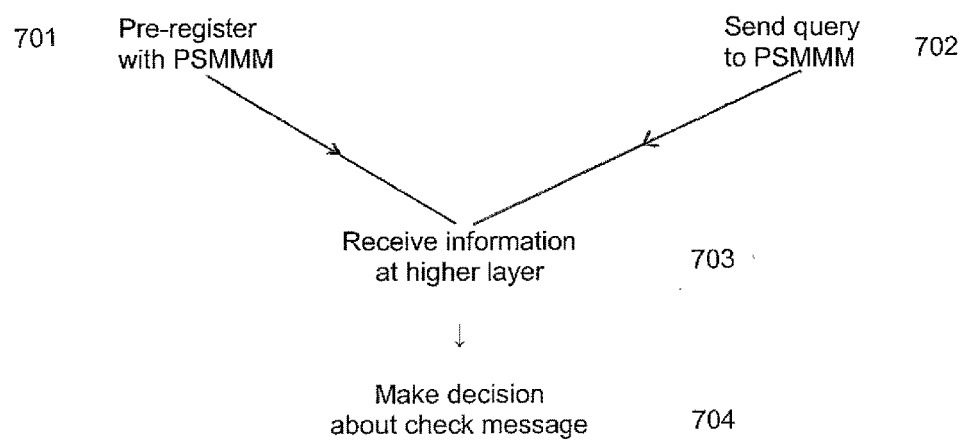
FIG. 7 is a block flow diagram of a method according to another embodiment of the present invention.

FIG. 7 is a block flow diagram showing the principal operations carried out at a higher layer protocol according to a method of the present invention. At 701, a higher layer protocol (or a module running a higher layer protocol) pre-registers with the power saving mode management module 13 of a node to receive information about whether an interface of the node is in its power saving mode. At 703, the higher layer protocol (or the module running the higher layer protocol) receives, from the power saving mode management module, information about whether an interface of the node is in its power saving mode and optionally how long the interface of the node has been in its power saving mode. This information may be received at pre-set times, for example at regular or sporadic intervals, or it may be sent whenever the interface enters or leaves its power saving mode. At 704, the higher layer protocol uses the received information to make a decision about check messages that the higher layer protocol would normally send—for example, the higher layer protocol may decide not to send the check message thereby to avoid awakening the interface from its power saving mode, or it may co-ordinate the sending of the check message with the sending of a check message from another higher layer protocol thereby to reduce the number of times that the interface must be awakened from its power saving mode.

Alternatively, the higher layer protocol (or the module running the higher layer protocol) may not pre-register with the power saving mode management module, but instead may send at 702 a query to the power saving mode management module of a node whenever it requires information about the power state of an interface of the node.

If the power saving mode management module 13 is implemented on the same hardware as the management CPU of the node rather than on the same hardware as the interfaces, some mechanism will be required to allow the power saving mode management module 13 to maintain a counter that records the number of refresh messages sent by the interface. For example, an interface may send to the power saving mode management module 13 a copy of every message transmitted by the interface, and the power saving mode management module 13 may update its counter based on the received copies of messages. Alternatively, an interface may notify the power saving mode management module 13 every time the interface transmits a message and the power saving mode management module 13 may update its counter based on the received notifications. As a further alternative, the counter may be separate from the power saving mode management module 13—for example, an interface 9*a*-9*c* may include a counter which keeps count of the number of refresh messages sent by the interface. The power saving mode management module 13 may then read the counter at the interface whenever it requires information about the power state of the interface to send to a higher level protocol.

As a yet further alternative, the power saving mode management module 13 may be a distributed module.

Figure 4:
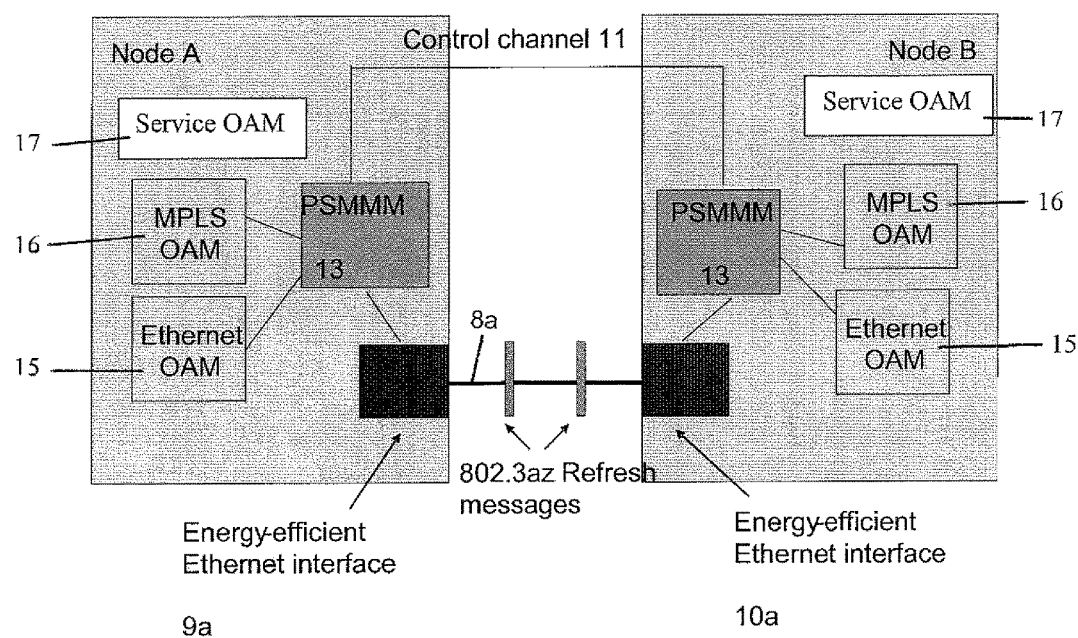
FIG. 4 is a schematic illustration of a network node according to another embodiment of the present invention.

FIG. 4 shows a network node according to another embodiment of the invention. The node of FIG. 4 corresponds generally to that of FIG. 3, and description of features of the node of FIG. 4 that are the same as for the node of FIG. 3 will not be repeated.

The node of FIG. 4 further includes a module 17 running a Service OAM protocol, which operates at layer 2 or above of the OSI layer scheme of FIG. 1 and which is in communication with the module 15 running the Ethernet OAM protocol. In this embodiment, the Ethernet OAM protocol participates in informing higher layer protocols of the power state of an interface of node A that is operable in a power saving mode. The module 15 running the Ethernet OAM protocol examines the tag of the outgoing frames to be sent from node A via an interface that is operable in a power saving mode. The frames may be, for example, Connectivity Check (CC) messages being sent by higher layer protocols. When the module 15 running the Ethernet OAM protocol detects (using information received from the power saving mode management module 13 or by querying the power saving mode management module 13) that the interface is in its power saving mode, the module 15 running the Ethernet OAM protocol will inform the module 17 running the Service OAM protocol. The module 17 running the Service OAM protocol can then take the action of re-routing the transmission or putting the higher layer protocols into a sleep mode in which the higher layer protocols do not exchange messages until the interface has awoken from its power saving mode.

Figure 5:
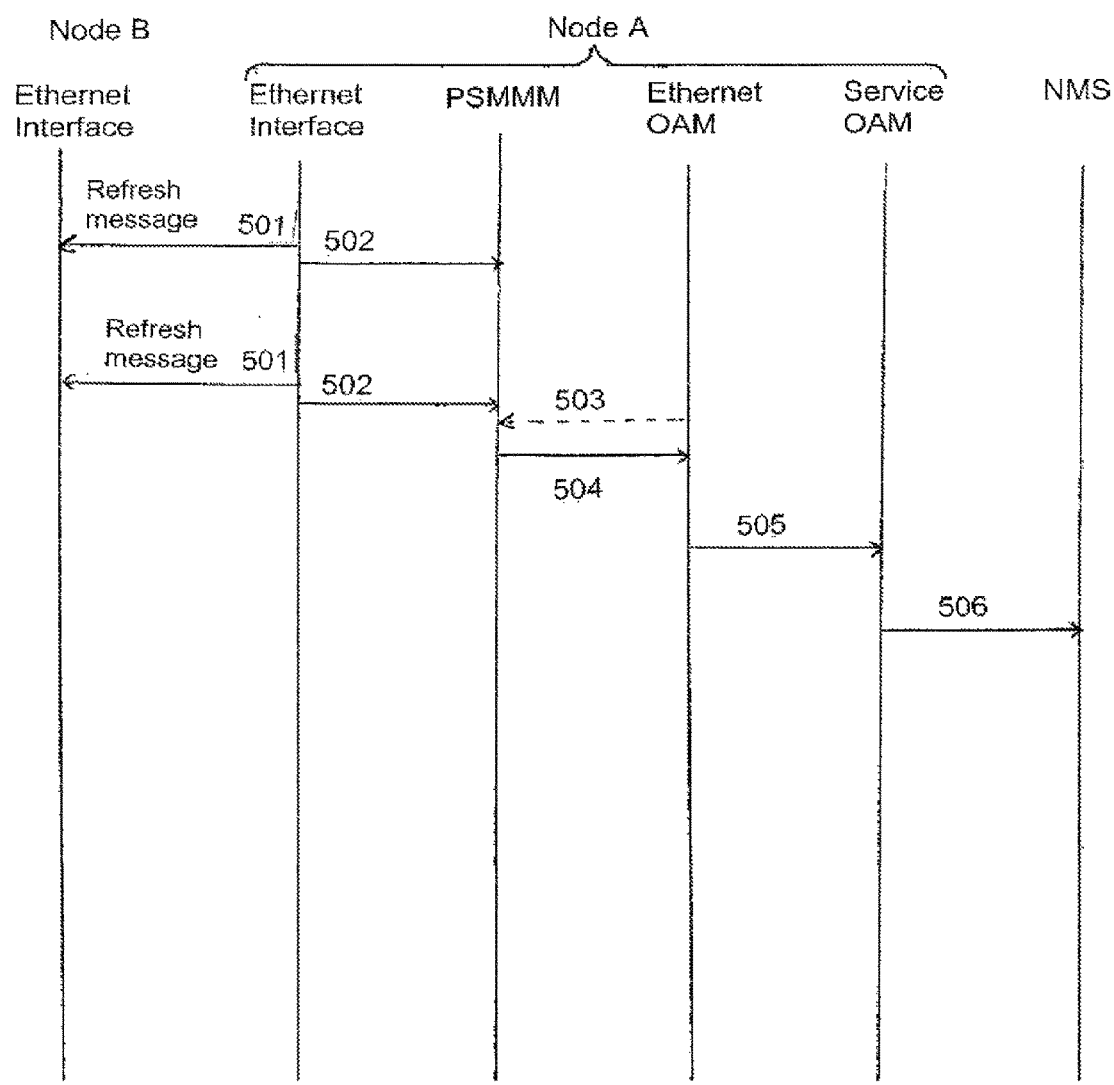
FIG. 5 illustrates message flows according to the embodiment of FIG. 4.

FIG. 5 illustrates one possible message flow in a node of FIG. 4.

At 501 of FIG. 5, an interface of node A that is in its power saving mode sends a check message to an interface of node B. FIG. 5 illustrates the case where the interface of node A is an Ethernet interface that has a power saving mode according to the IEEE 802.3 az standard and that sends a "refresh" message at 501. At 502 the interface of node A informs the power saving mode management module of node A of the refresh message, for example by sending a copy of the refresh message or notification of the refresh message.

Sending the refresh message at 501 and informing, at 502, the power saving mode management module of node A of the refresh message are carried out at regular intervals according to the IEEE 802.3 az standard, although only two occurrences are shown in FIG. 5 for clarity.

When the module 15 running the Ethernet OAM protocol of node A has a message to be sent according to a higher layer Service OAM protocol from node A via the interface, it makes use of information about the power state of the interface that it has received at 504 from the power saving mode management module of node A. The information received at 504 by the module 15 running the Ethernet OAM protocol may have been sent in response to a specific query sent by the module 15 running the Ethernet OAM protocol at 503, although in embodiments in which the module 15 running the Ethernet OAM protocol has registered with the power saving mode management module of node A to receive information about the interface it may not be necessary for the module 15 running the Ethernet OAM protocol to send a specific query at 503.

If the module 15 running the Ethernet OAM protocol determines that the interface is in its power saving mode, the module 15 running the Ethernet OAM protocol informs the module 17 running the Service OAM protocol of this at 505. The module 17 running the Service OAM protocol can then take the action of re-routing the transmission so that the transmission is not sent via the interface thereby to avoid awakening the interface from its power saving mode or of putting the higher layer protocols into a sleep mode in which the higher layer protocols do not exchange messages until the interface has awoken from its power saving mode.

At 506, the module 17 running the Service OAM protocol informs the Network Management System 14 of the action it has taken, eg if it has put the higher layer protocols into a sleep mode in which the higher layer protocols do not exchange messages.

Message flows in other embodiments of the invention may be generally similar to the message flow of FIG. 5. As an example, FIG. 8 shows a possible message flow for a node of FIG. 3.

Figure 8:
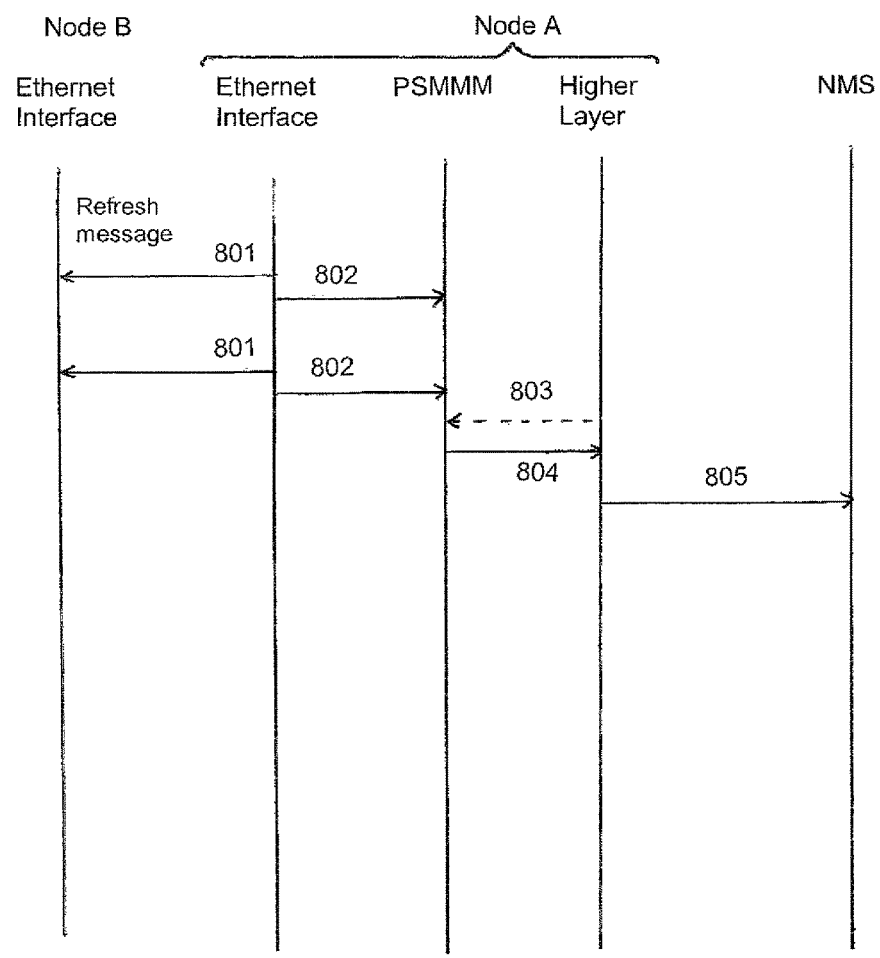
FIG. 8 illustrates message flows according to the embodiment of FIG. 3.

At 801 of FIG. 8, an interface of node A that is in its power saving mode sends a check message to an interface of node B. At 802 the interface of node A informs the power saving mode management module of node A of the refresh message, for example by sending a copy of the refresh message or notification of the refresh message. These messages correspond to the messages 501 and 502 of FIG. 5, and their detailed description will not be repeated. Sending the refresh message at 801 and informing, at 802, the power saving mode management module of node A of the refresh message are carried out at regular intervals according to the IEEE 802.3 az standard, although only two occurrences are shown in FIG. 8 for clarity.

At 804 a module operating according to a higher layer protocol (for example the Ethernet OAM module 15 or the MPLS OAM module 16 of node A, or a module operating according to another higher layer protocol) obtains, from the power saving mode management module of node A, information about the power state of the interface. The information obtained at 804 may have been sent by the power saving mode management module in response to a specific query sent by the module operating according to a higher layer protocol at 803, although in embodiments in which the module operating according to a higher layer protocol has registered with the power saving mode management module of node A to receive information about the interface it may not be necessary for the module operating according to a higher layer protocol to send a specific query at 803.

The module operating according to the higher layer protocol may then use the information about the power state of the interface in making a decision, for example a decision not to send a check message or a decision to co-ordinate the sending of a check message with the sending of a check message by another higher layer. At 805, the module operating according to the higher layer protocol informs the NMS of the decision it has made.

The invention claimed is:

1. A network node comprising
an interface; and
a management module, wherein:
the interface is adapted to switch from a normal mode of operation to a power saving mode of operation, the power saving mode being different to the normal mode, and
the management module for maintaining information about whether the interface is in the power saving mode of operation, the management module adapted to communicate with one or more layers higher than the physical layer of the interface about whether the interface is in the power saving mode of operation, wherein one or more layers higher than the physical layer of the interface restricts a sending of a check message to the interface of the network node on the basis of knowledge that the interface is in the power saving mode, wherein the management module is adapted to send information about whether the interface is in a power saving mode of operation to one or more higher layers that have registered with the management module to receive information about whether the interface is in a power saving mode of operation.

2. The network node as claimed in claim 1 wherein the management module is adapted to communicate with a layer higher than the physical layer in response to a query received from the layer higher than the physical layer.

3. The network node as claimed in claim 1, and further comprising a communication channel for communicating with another network node about whether the interface is in a power saving mode of operation, the communication channel being separate from the interface.

4. The network node as claimed in claim 1, wherein the management module is adapted to maintain a count of refresh message sent by the interface while the interface is in the power saving mode.

5. The network node as claimed in claim 1, wherein the node is an Ethernet node and comprises an Ethernet operation administration and maintenance, OAM module, the Ethernet OAM module being in communication with the management module.

6. The network node as claimed in claim 5 and further comprising a service OAM module, the Ethernet OAM module communicating with the service OAM module.

7. The network node as claimed in claim 6 wherein the Ethernet OAM module is adapted, upon receipt from the Service OAM module for transmission from the interface, to:
determine the type of frame; and
for at least one type of frame, inform the Service OAM module if the interface is in its power saving mode.

8. A method of operating a network node having an interface and a management module,
the method comprising:
switching, by the interface, from a normal mode of operation to a power saving mode of operation, the power saving mode being different to the normal mode;
maintaining, by the management module within the network node, information about whether the interface is in the power saving mode of operation; and
sending, to one or more layers higher than the physical layer of the interface, information about whether the interface is in the power saving mode of operation, wherein one or more layers higher than the physical layer of the interface receives said information and restricts a sending of a check message to the interface on the basis of knowledge that the interface is in the power saving mode, wherein the sending further sends information about whether the interface is in a power saving mode of operation to one or more higher layers that have registered with the management module to receive information about whether the interface is in a power saving mode of operation.

9. The method as claimed in claim 8 and comprising sending information about whether the interface is in the power saving mode of operation to a layer higher than the physical layer in response to a query received from the layer higher than the physical layer.

10. The method as claimed in claim 8, and comprising communicating with another network node about whether the interface is in a power saving mode of operation over a communication channel that is separate from the interface.

11. The method as claimed in claim 8, and comprising maintaining, at the management module, a count of refresh message sent by the interface while the interface is in the power saving mode.

12. The method as claimed in claim 8, wherein the node is an Ethernet node having an Ethernet OAM module, and wherein the method comprises the Ethernet OAM module communicating with the management module.

13. The method as claimed in claim 12 wherein the network node comprises a service OAM module, and wherein the method comprises the Ethernet OAM module communicating with the service OAM module.

14. The method as claimed in claim 13 wherein the Ethernet OAM module:
   upon receipt of a frame from the Service OAM module for transmission from the interface, determines the type of frame; and
   for at least one type of frame, inform the Service OAM module if the interface is in its power saving mode.

15. A method comprising:
   receiving, at a higher layer than the physical layer of an interface of a network node having different modes of operation, including a power saving mode and a normal mode, information about whether the interface has switched to the power saving mode of operation; and
   making a decision to restrict a sending of a check message to the interface by the higher layer of said network node on the basis of knowledge that the interface is in the power saving mode, wherein the higher layer has pre-registered with the network node to receive information about whether the interface is in a power saving mode of operation.

16. The method as claimed in claim 15, wherein the higher layer receives the information about whether the interface is in a power saving mode of operation in response to a query sent to the network node by the higher layer.

17. The method as claimed in claim 15, wherein making a decision about sending a check message comprises the higher layer coordinating the sending of the check message with the sending of a check message from another higher layer.

18. A non-transitory machine readable medium that provides instructions which, when executed by a set of processors, cause the set of processors to perform operations comprising:
   maintaining, at a management module within a network node, information about whether an interface having a power saving mode of operation and a normal mode of operation, the power saving mode being different to the normal mode, has switched from the normal mode of operation to the power saving mode of operation; and
   sending, to one or more layers higher than the physical layer of the interface, information about whether the interface has switched to the power saving mode of operation, wherein one or more layers higher than the physical layer of the interface receives said information and restricts a sending of a check message to the interface on the basis of knowledge that the interface is in the power saving mode, wherein the higher layer has pre-registered with the network node to receive information about whether the interface is in a power saving mode of operation.

19. A network node comprising:
an interface; and
a management module, wherein:
   the interface is adapted to switch from a normal mode of operation to a power saving mode of operation, the power saving mode being different to the normal mode, and
   the management module maintaining information about whether the interface is in the power saving mode of operation, the management module being adapted, upon becoming aware that the interface has changed between the normal mode of operation and the power saving mode of operation, to inform one or more layers higher than the physical layer of the interface that the interface has changed between the normal mode of operation and the power saving mode of operation, wherein one or more layers higher than the physical layer of the interface receives said information and restricts a sending of a check message to the interface on the basis of knowledge that the interface is in the power saving mode, wherein the management module is adapted to send information about whether the interface is in a power saving mode of operation to one or more higher layers that have registered with the management module to receive information about whether the interface is in a power saving mode of operation.

* * * * *